United States Patent [19]

Momose et al.

[11] Patent Number: 5,769,180
[45] Date of Patent: Jun. 23, 1998

[54] STEERING SYSTEM FOR WORKING VEHICLE AND THE METHOD THEREOF

[75] Inventors: Shinroku Momose, Ota; Yasuhiko Miyamoto, Omiya, both of Japan

[73] Assignee: Fuji Jukogyo Kabushiki Kaisha, Tokyo, Japan

[21] Appl. No.: 563,548

[22] Filed: Nov. 28, 1995

[51] Int. Cl.$^6$ ........................................................ B62D 5/26
[52] U.S. Cl. ............................ 180/424; 180/417; 280/97
[58] Field of Search ..................................... 180/417, 424, 180/434, 435, 436, 437, 448; 280/97, 98, 103, 113

[56] References Cited

U.S. PATENT DOCUMENTS

| | | | |
|---|---|---|---|
| 3,027,963 | 4/1962 | Nicholson | 180/424 |
| 3,370,670 | 2/1968 | Love | 180/424 X |
| 5,046,577 | 9/1991 | Hurlburt | 180/424 X |
| 5,297,648 | 3/1994 | Hansen et al. | 180/424 |

Primary Examiner—Kevin Hurley
Attorney, Agent, or Firm—Beveridge, DeGrandi, Weilacher & Young, LLP

[57] ABSTRACT

A steering system and method of a mowing vehicle comprise Left and right rear wheels rotating about a king pin for steering the vehicle, an Ackermann steering mechanism for steering these left and right rear wheels and a rear axle housing swingably connected with the vehicle about a yawing axis in a horizontal plane by use of a hydraulic cylinder. When the vehicle makes a U-turn for example to the right during the mowing work, the rear axle housing is fully swung to the left in the horizontal plane by a specified angle and fixed therein while the left and right rear wheels are held at the neutral position. After the rear axle housing is fixed at that angle, the left and right rear wheels are rotated about the king pin to the left and then the vehicle makes a U-turn to the right. When the vehicle finishes to turn, the left and right rear wheels are rotated about the king pin to the right until the neutral position and then the rear axle housing is swung in the horizontal plane back to the right until the neutral position. When the vehicle makes a U-turn to the left, the same operations are carried out. Since the rear wheels are steered after the rear axle housing is swung in the horizontal plane and fixed, the vehicle can make a U-turn with a minimal turning radius, retaining the Ackermann steering condition and the lawn can be prevented from being damaged by the wheels.

10 Claims, 14 Drawing Sheets

U-TURN CONTROL ROUTINE

STEERING SYSTEM FOR WORKING VEHICLE AND THE METHOD THEREOF

BACKGROUND OF THE INVENTION

1. Field of the Invention

The present invention relates to a steering system and method of a working vehicle and specifically to a steering system and method of a working vehicle used for lawn mowing, agricultural works, construction works and the like.

2. Prior Arts

Generally, it is desirable that a turning radius of a working vehicle is as small as possible from the viewpoint of the working efficiency and handlingability. There are so many techniques for reducing the turning radius of vehicles used for miscellaneous indoor or outdoor works. Among them, Japanese Unexamined Patent Application Toku-Kai-Sho 59-6170 discloses a steering linkage mechanism by which when a steering wheel is turned, an axle housing is swung in the steering direction and at the same time each wheel provided at the both ends of the axle housing is pivotably turned for steering.

Further, Japanese Unexamined Patent Application Toku-Kai-Sho 63-203473 discloses a steering mechanism in which, when a steering wheel is turned, an axle housing is swung in the steering direction so as to increase the steering angle of wheels after front wheels are turned at a specified angle.

Further, Japanese Unexamined Patent Application Toku-Kai-Sho 61-18567 proposes a mechanism in which, when a steering wheel is turned, front wheels are turned and at the same time a vehicle body is folded at the middle portion thereof so as to increase the steering angle of the front wheels.

Furthermore, Japanese Unexamined Patent Application Toku-Kai-Hei 1-108909 presents a steering control mechanism, or a so-called "fourwheel steering mechanism" in which both front and rear wheels are pivotably turned in the adverse direction to each other so as to reduce a turning radius of the vehicle.

In recent years, autonomous running type lawn mowing vehicles which can mow the lawn of golf courses unmannedly have been proposed. These vehicles are required to mow the lawn in such a way that the going pass and the returning pass come alternately with an exactly equal interval and that no uncut lawn is left. Further, since they must run about in a vast area, quick directional turnings are required. Further, when those vehicles make U-turns, they are required to be operated so as not to damage the lawn by turning wheels.

However, in the steering mechanisms according to Toku-Kai-Sho 59-6170, Toku-Kai-Sho 63-203473 and Toku-Kai-Sho 61-18567, when the axle housing is swung in the horizontal plane with the front wheels held at an angle, the front wheels give a damage to the Lawn due to the side slip. Further, since first the front wheels are pivotably turned and then the axle housing is swung in the horizontal plane, it is difficult to make a quick turn on the Lawn. Furthermore, the fourwheel steering mechanism according to Toku-Kai-Hei 1-108909 contains defects that it needs a sophisticated technology and its manufacturing cost is high. Further, the weight of the vehicle is so heavy that the high ground pressure gives a damage to the lawn.

SUMMARY OF THE INVENTION

Accordingly, the present invention is intended to obviate the abovementioned problems and disadvantages of the prior arts and the objects of the present invention will be summarized as follows.

An object of the present invention is to provide a steering system of a working vehicle capable of making a turn with a minimal turning radius and of quickly moving to the next pass.

Another object of the present invention is to provide a steering system of a working vehicle capable of entering the next pass with a high precision.

Further object of the present invention is to provide a steering system of a working vehicle capable of making a U-turn without damaging the lawn.

Still further object of the present invention is to provide a steering system having a simple construction and a right weight.

To achieve these objects mentioned above, the steering system according to the present invention comprises:

means for swinging an axle housing in a horizontal plane about an axis provided in a vehicle at a specified swinging angle and for fixing the axle housing at the swinging angle while a steering wheel rotatably connected with a king pin provided in the axle housing is fixed at a neutral position;

means for rotating said the wheel about the king pin at a specified steering angle according to an Ackermann's steering condition and for fixing the steering wheel at the specified steering angle while the axle housing is fixed at the specified swinging angle;

means for rotating the steering wheel according to the Ackermann's steering condition from the specified steering angle back to a neutral position and fixing the steering wheel at the neutral position;

means for swinging the axle housing from the specified swinging angle to a position where the axle housing and a lengthwise center line of the vehicle meet orthogonally and for fixing the axle housing at the position; and means for rotating the steering wheel about the king pin discretionally while the axle housing is fixed at the position.

BRIEF DESCRIPTION OF THE DRAWINGS

A specific embodiment of the present invention will be described with reference to the accompanying drawings, in which.

DETAILED DESCRIPTION OF PREFERRED EMBODIMENTS

Figure 1:
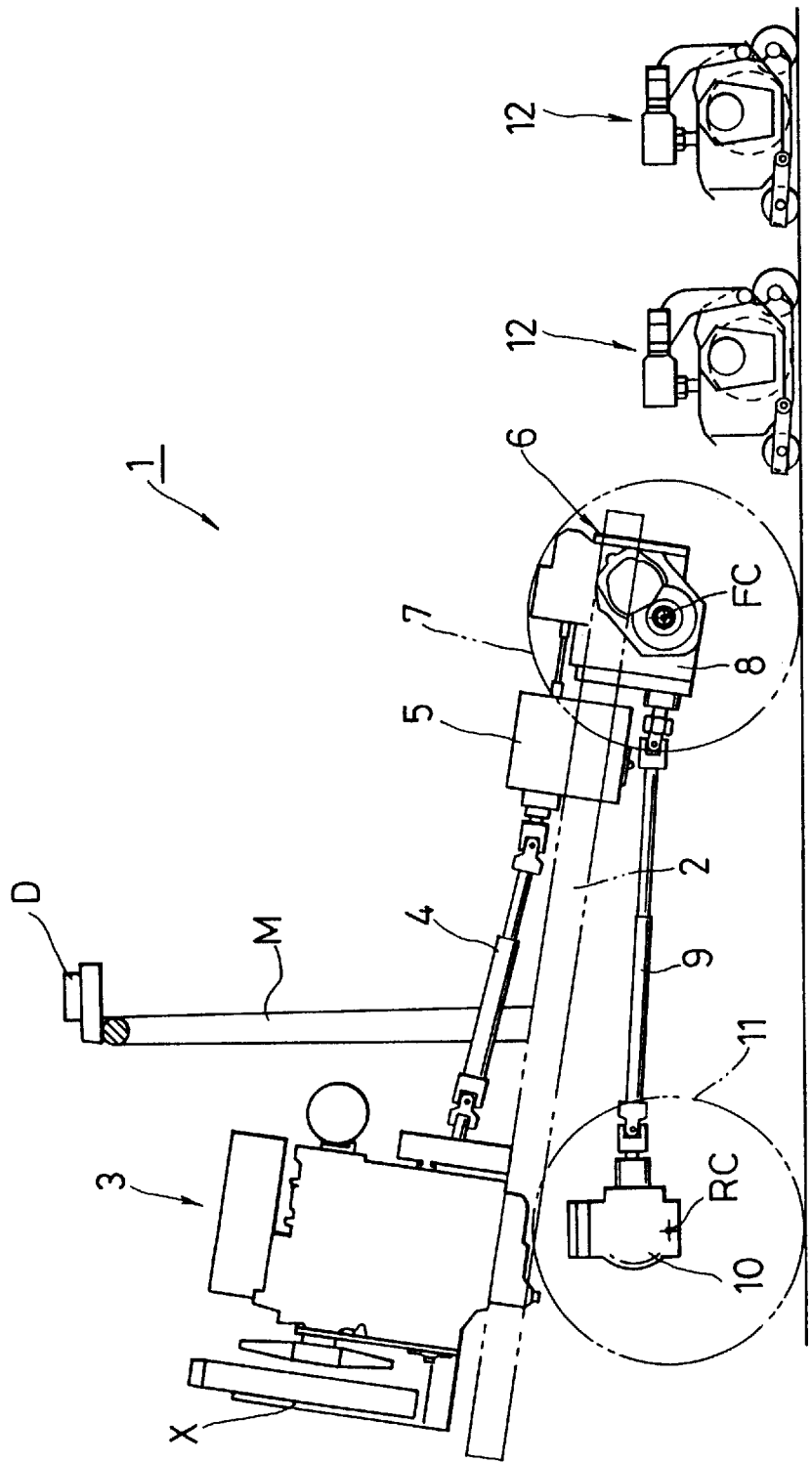
FIG. 1 is a side view showing a chassis construction of a working vehicle equipped with a steering system according to the present invention.

Referring now to FIG. 1, numeral 1 denotes an autonomous running type Lawn mowing vehicle which can mow the lawn in a golf course unmannedly and autonomously according to a navigation method comprising a position recognition using a GPS (Global Positioning System) navigation method, an earth magnetism sensor, an encoder for detecting the wheel speed or the Like, a trace running using a boundary detecting sensor for detecting a boundary between the mowed and unmowed areas, and a course selection according to a running program.

A driving force generated in an engine 3 which is installed at the rear of a chassis frame 2 is transferred to a HST (Hydraulic Static Transmission) type transmission 5 through a propeller shaft 4. The driving force subjected to a speed change in the transmission 5 is transmitted to a differential gear provided in a front axle housing 6 to drive left and right front wheels 7. On the other hand, a driving force picked up from a gear box 8 provided in the front axle housing 6 is transmitted to a differential gear provided in a rear axle housing 10 through a propeller shaft 9 to drive left and right rear wheels 11. That is to say, the vehicle 1 is a fourwheel drive type working vehicle driven by both the pairs of front wheels 7 and rear wheels 11 (since in this embodiment rear wheels are rotatable for steering the vehicle, referred to as "steering wheels" hereinafter). Further, in this working vehicle 1 a lawn mowing machine 12 is suspended from a suspension mechanism (not shown) provided at the front of the chassis frame 2.

Figure 2:
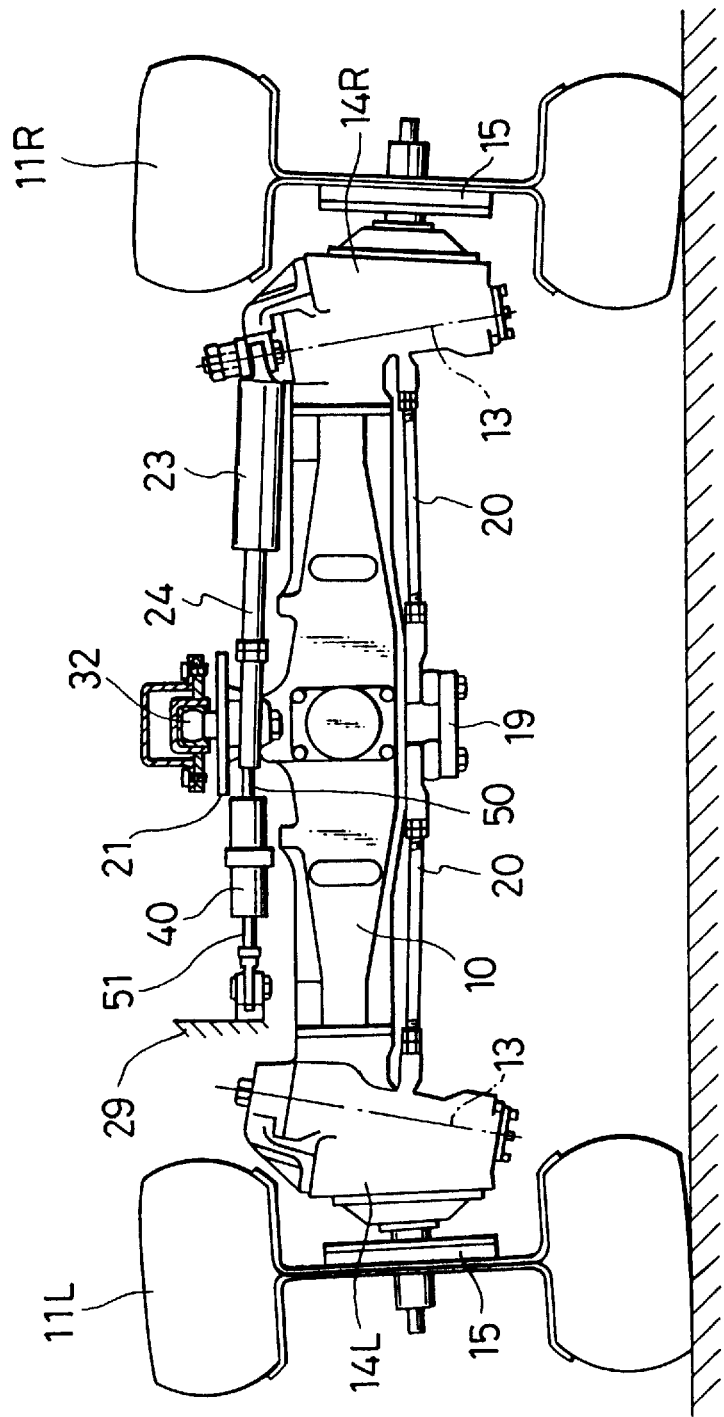
FIG. 2 is a rear view showing a rear axle housing according to the present invention.
Figure 3:
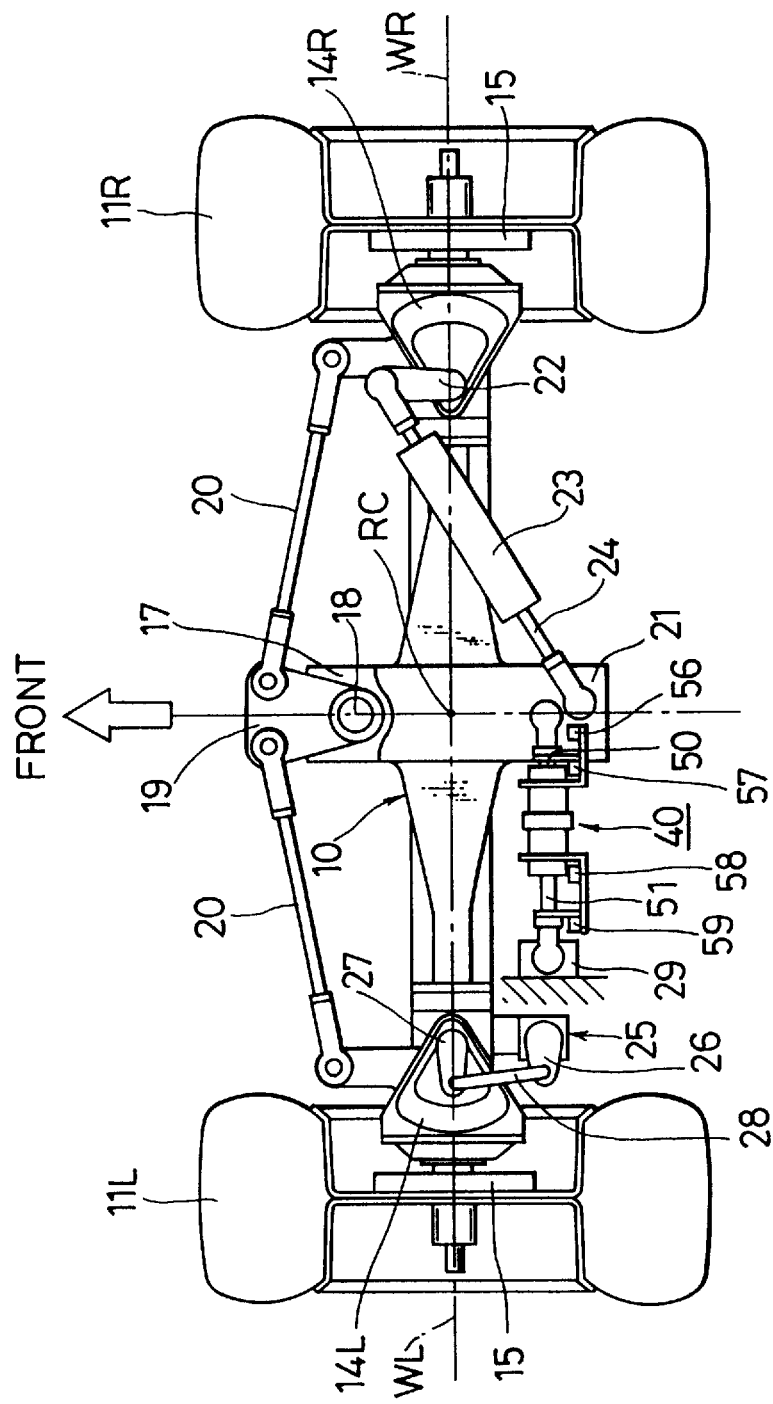
FIG. 3 is a plan view showing a rear axle housing according to the present invention.
Figure 4:
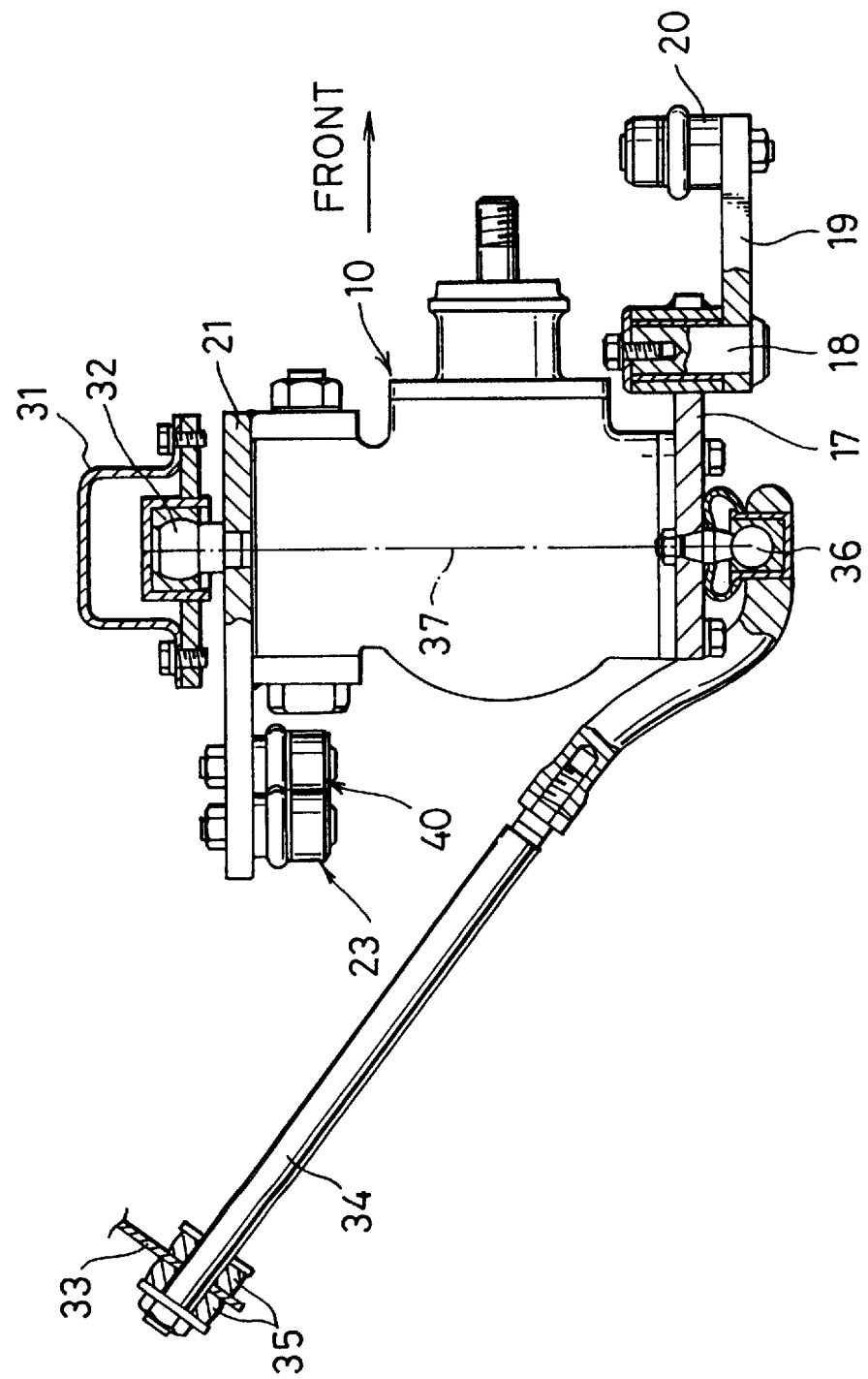
FIG. 4 is a side view showing a rear axle housing according to the present invention.

Referring to FIG. 2, a pair of bevel knuckles, a left one 14L and a right one 14R are pivotably connected about a king pin 13 with a left and right end of the rear axle housing 10. The left and right rear wheels 11L and 11R are respectively connected with left and right hubs 15 driven by a gear mechanism built in the bevel knuckles 14L and 14R. Further, as shown in FIG. 3 and FIG. 4, the rear axle housing 10 is connected at the lower portion thereof with a Lower plate 17 and a control plate 19 is connected with the Lower plate 17 swingably about a pivot 18 in the transversal direction of the vehicle on the horizontal plane. Further, a pair of Left and right tie-rods 20 are connected at one end thereof with the front end of the control plate 19 and connected at the other end thereof with the left and right bevel knuckles 14L and 14R respectively. Generally, this mechanism is called "Ackermann steering mechanism".

Further, the rear axle housing 10 is connected at the upper portion thereof with an upper plate 21 and an arm 22 is fixed to the upper portion of the right bevel knuckle 14R. Between the upper plate 21 and the arm 22 there is provided a hydraulic cylinder 23 for steering the rear steering wheels.

Thus, when the hydraulic cylinder 23 is expanded, the rear right steering wheel 11R is turned around the king pin 13 to the right and at the same time the rear left steering wheel 11L is turned around the king pin 13 to the right with respect to the rear axle housing 10 by means of the above Ackermann steering mechanism. On the contrary, when the hydraulic cylinder 23 is contracted, the rear steering wheels 11R and 11L are turned to the left with respect to the rear axle housing 10. Since this working vehicle 1 introduces a rear wheel steering method, when the rear steering wheels 11 are steered to the right, the working vehicle 1 is turned to the left and when the rear steering wheels 11 are steered to the left, the working vehicle 11 is turned to the right.

Further, as shown in FIG. 3, a steering angle sensor 25 is disposed at the Left end of the rear axle housing 10. The steering angle sensor 25 is operated by a rod 28 connecting a Lever 26 fixed to the steering angle sensor 25 and a lever 27 fixed to the left bevel knuckle 14L. The purpose of the steering angle sensor 25 is to detect a relative steering angle of the rear left steering wheel 11L with respect to the rear axle housing 10, i.e., an inclination angle formed by an axle line RC of the rear axle housing 10 and a wheel axle Line WL of the rear left steering wheel 11L.

Further, as shown in FIG. 4, the rear axle housing 10 is pivotably connected at the upper portion thereof with a rear cross member 31 fixed to the rear part of the chassis frame 2 through an upper ball-and-socket joint 32. On the other hand, the chassis frame 2 is connected at the rear end thereof with a trailing rod 34 extended in the obliquely forward and downward direction through a pair of rubber bushings 35 and the trailing rod 34 is connected at the other end thereof with the lower plate 17 through a lower ball-and-socket joint 36 whose ball-with stud is bolted on the lower surface of the rear axle housing 10. Since the upper ball-and-socket joint 32 and the lower ball-and-socket joint 36 share a common axis extended vertically, the rear axle housing 10 swings on the horizontal plane or yaws about the common axis, that is, a yawing axis 37 in the steering (yawing) direction. Further, since the rear axle housing 10 is pivotably connected with the chassis frame 2 through the ball-and-socket joint 32, the rear axle housing 10 can make rolling motions around the ball-and-socket joint 32 so as to be able to follow up the running on uneven roads. When the rear axle housing 10 makes rolling motions, the end of the trailing rod 34 swings pivotably about the rubber bushings 35 in the widthwise direction of the vehicle.

Figure 5:
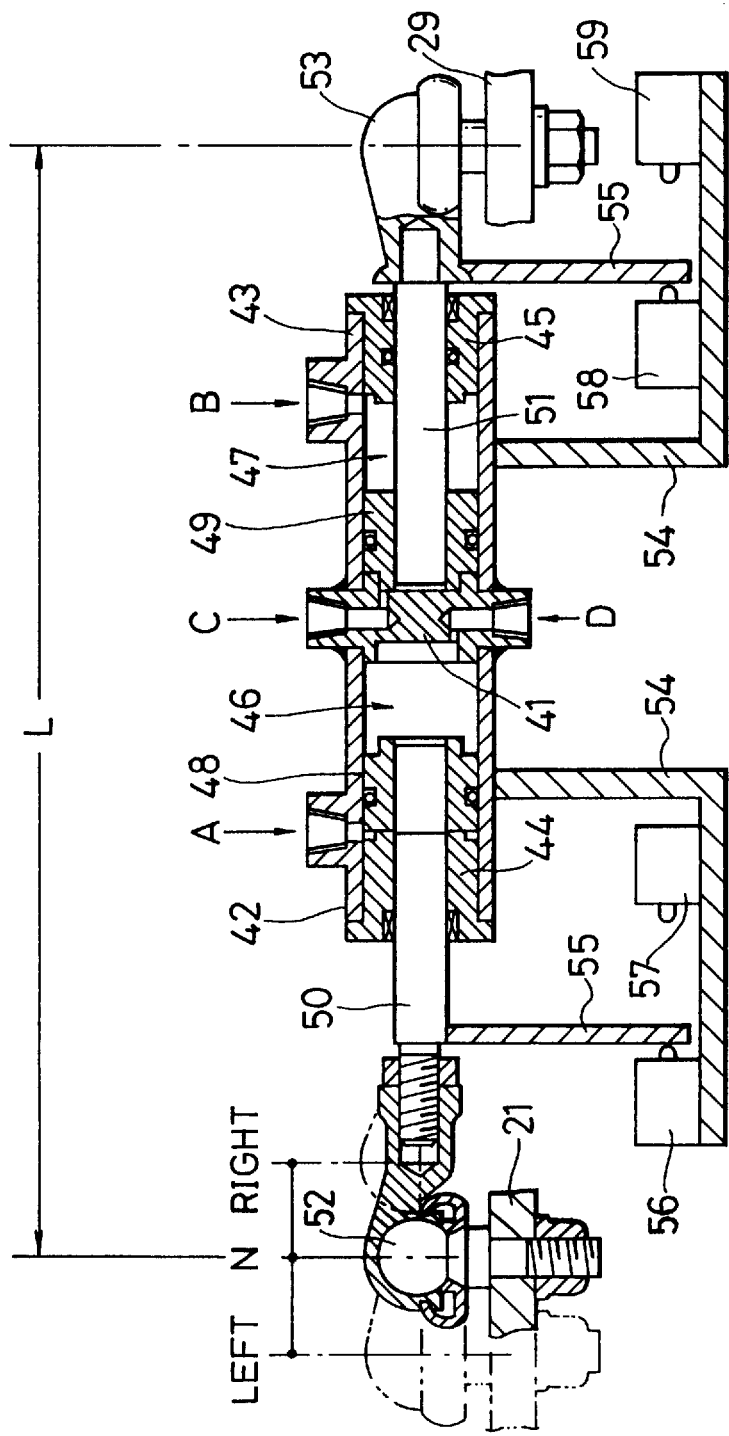
FIG. 5 is a longitudinal sectional view showing a hydraulic cylinder for swinging a rear axle housing according to the present invention.

On the other hand, as illustrated in FIG. 2 and FIG. 3, there is provided a hydraulic cylinder 40 for applying a yawing motion to the rear axle housing 10 between the upper plate 21 and the bracket 29 fixed to the vehicle body. As shown in FIG. 5, the hydraulic cylinder 40 comprises a pair of cylinders 42 and 43 having the same stroke. The hydraulic cylinder 40 is constituted by a pair of the left and right cylinders 42, 43 connected with each other on the same axis through a partition wall 41, a pair of stoppers 44, 45 for closing an open end of each cylinder, a pair of pistons 48, 49 slidably inserted in the cylinder 42, 43, a pair of pressure chambers 46, 47 provided inside of the cylinders 42, 43 and a pair of piston rods 50, 51 connected at an end thereof with the pistons 48, 49. The end of the piston rod 50 is connected with the aforementioned upper plate 21 through a ball-and-socket joint 52 and the end of the piston rod 51 is connected with the bracket 29 grounded on the vehicle body through a ball-and-socket joint 53.

Pressure oil is supplied to the hydraulic cylinder 40 through ports A, B, C and D provided in the cylinders 42, 43 and the partition wall 41. When pressure oil is fed to the ports A and B, the pistons 48 and 49 travel inward and finally come into contact with the partition wall 41 respectively. With this movement of the pistons, the rods 50, 51 are intruded into the cylinders 42, 43 and the total length L of the cylinder 40 becomes shortest (most contracted condition). When pressure oil is fed to the ports C and D, the pistons 48, 49 travel outward and finally come into contact with the stoppers 44, 45 respectively. Being accompanied with this, the rods 50, 51 are protruded out of the cylinders 42, 43 respectively and the total length L of the cylinder 40 becomes longest (most expanded condition). On the other hand, when pressure oil is supplied to the ports A and C, the rod 50 is intruded into the cylinder 42 and the rod 51 is protruded from the cylinder 43. Further, when pressure oil is supplied to the ports D and B, the rod 50 is protruded from the cylinder 42 and the rod 51 is intruded into the cylinder 43. In these conditions, the total length L of the hydraulic cylinder 40 becomes medium (intermediate condition). Thus, according to the way of supplying pressure oil, the hydraulic cylinder 40 for yawing the rear axle housing can be retained and fixed in any condition among "most contracted condition", "most expanded condition" and "intermediate condition".

When the hydraulic cylinder 40 is fixed in "most contracted condition", the rear axle housing 10 is yawed about the yawing axis 37 clockwise on the plan view at a specified angle (in this embodiment 15 degrees) and fixed at that position. When the hydraulic cylinder 40 is fixed in "most expanded condition", the rear axle housing 10 is yawed about the yawing axis 37 counterclockwise on the plan view at a specified angle (15 degrees) and fixed at that position. On the other hand, when the hydraulic cylinder 40 is fixed in "intermediate condition", the rear axle housing 10 is fixed in a "not yawed state", namely at a state where the axle line RC of the rear axle housing 10 is extended orthogonally with respect to the longitudinal direction of the vehicle.

Further, there is provided an L-shaped bracket 54 on the cylinders 42, 43 of the hydraulic cylinder 40 respectively. Further, a stop plate 55 is connected with the rod 50, 51 respectively. Further, at the bracket 54 on the left side there are provided Limit switches 56 and 57 for detecting "most expanded condition" and "most contracted condition" of the rod 50 respectively by the contact of the stop plate 55 with these limit switches. Similarly, at the bracket 54 on the right side there are provided limit switches 58 and 59 for detecting "most expanded condition" and "most contracted condition" respectively.

Figure 6:
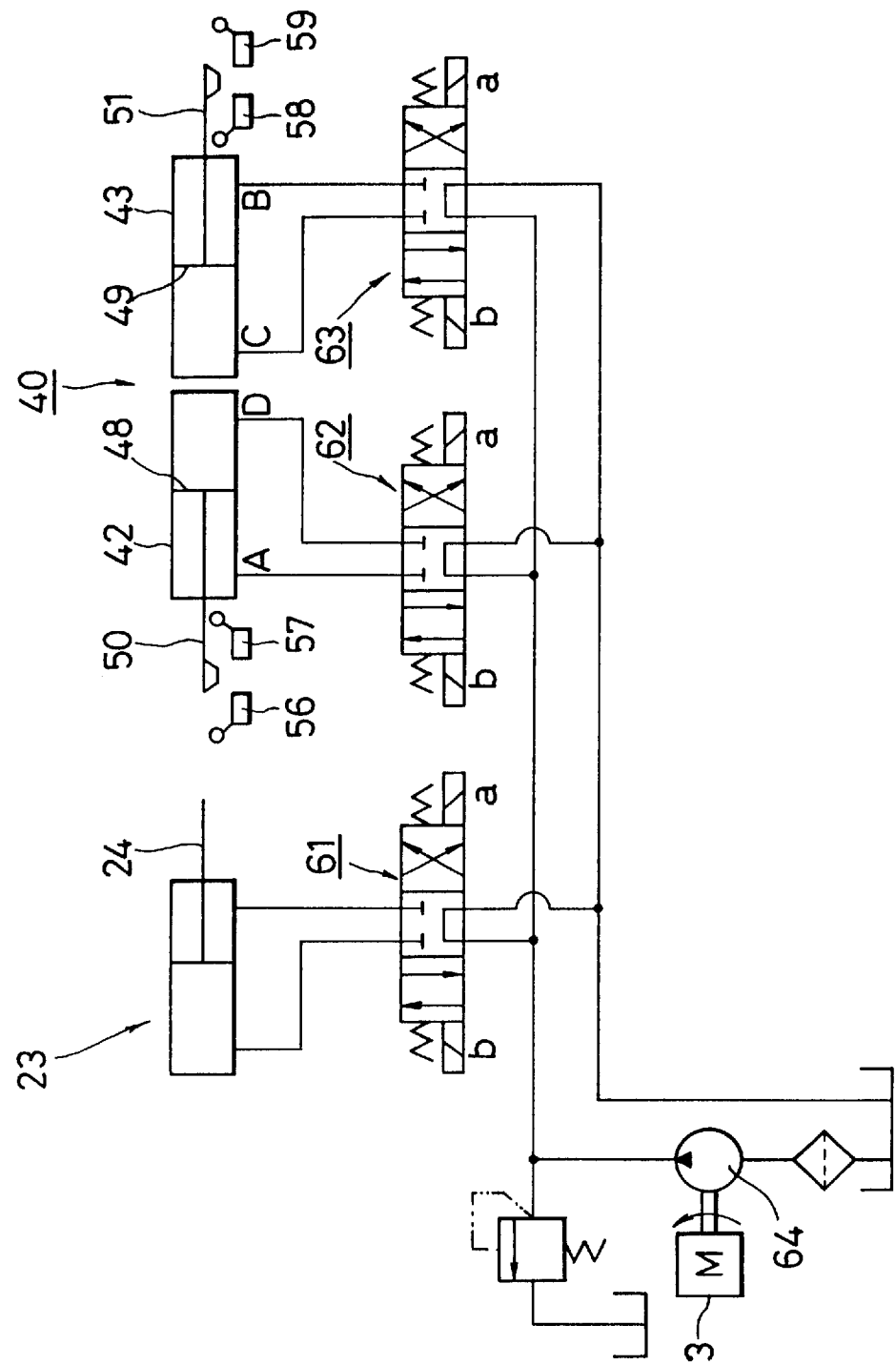
FIG. 6 is a diagram showing a hydraulic circuit for controlling a rear wheel steering cylinder and a rear axle housing swinging cylinder.

Next, a hydraulic circuit to control the hydraulic cylinder 23 for steering the rear wheels and the hydraulic cylinder 40 for yawing the rear axle housing will be described with reference to FIG. 6.

An operation of the hydraulic cylinder 23 is controlled by a solenoid operated directional control valve 61 of the 4 ports-3 positions type. Further, an operation of the hydraulic cylinder 40 is controlled by a pair of solenoid operated directional control valves 62, 63 of the 4 ports-3 positions type. Pressure oil is supplied to these directional control vales 61, 62 and 63 from a hydraulic pump 64 driven by the engine 3.

Figure 7:
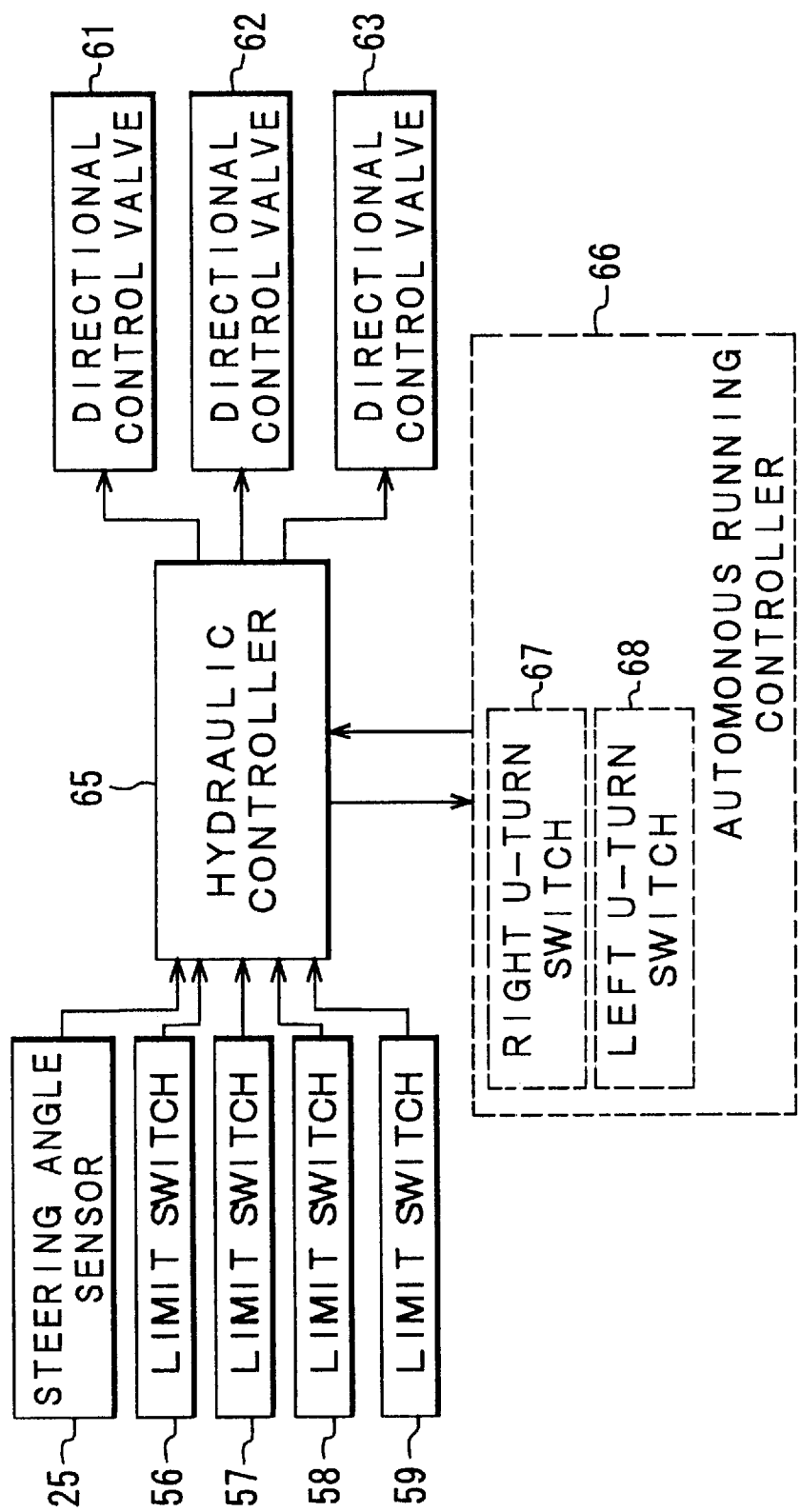
FIG. 7 is a block diagram showing a steering control according to the present invention.

On the other hand, referring to FIG. 7, the steering angle sensor 25, the limit switches 56, 57, 58 and 59 are connected with a hydraulic controller 65 respectively. Further, there is provided an autonomous running controller 66 to send miscellaneous instruction signals for controlling the autonomous running of the working vehicle 1 to the hydraulic controller 65. The hydraulic controller 65 acts as selecting these directional control valves 61, 62 and 63 based on those instruction signals so as to determine the running direction of the working vehicle 1 by controlling the hydraulic cylinder 23 for steering the rear steering wheels and the hydraulic cylinder 40 for yawing the rear axle housing.

Figure 8:
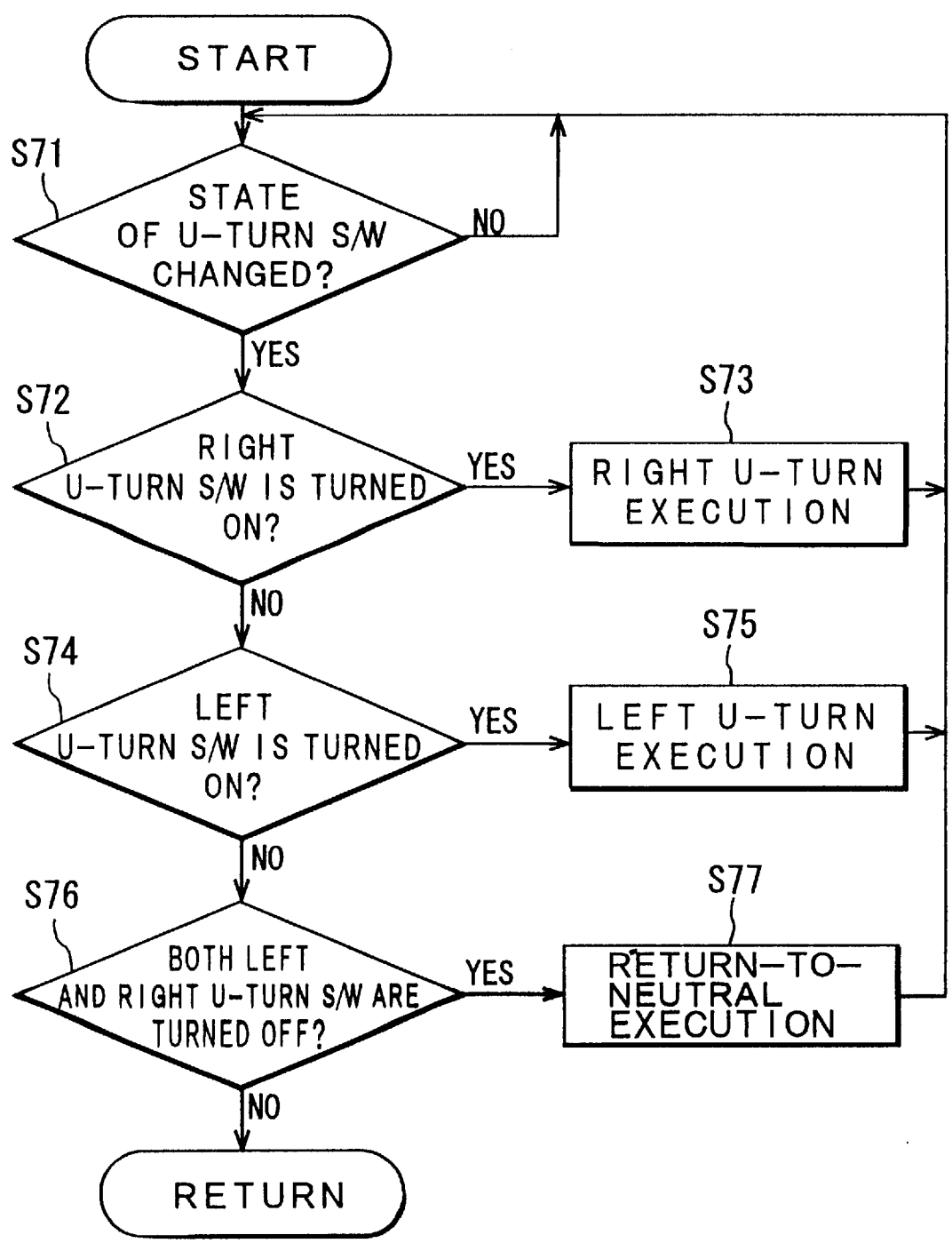
FIG. 8 is a flowchart of a steering control when a vehicle makes a U-turn.

The abovementioned steering control by the hydraulic controller 65 is performed according to a U-turn control routine as shown in FIG. 8. That is to say, when the autonomous controller 66 recognizes that the working vehicle 1 reaches an end of a mowing pass and it is judged that the vehicle must make a U-turn, either a right U-turn switch 67 is turned on or a Left U-turn switch is turned on. That is, at S71 it is judged whether or not the state of the U-turn switch is changed. If it is judged to be YES, the program goes to S72 where it is judged whether or not the right U-turn switch 67 is turned on. If the right U-turn switch 67 is turned on, the program goes to S73 in which an operation of the right U-turn is executed.

On the other hand, if the right U-turn switch 67 is turned off, the program steps to S74 where it is judged whether or not the Left U-turn switch 68 is turned on. If the left U-turn switch 68 is turned on, the program goes to S75 where the Left U-turn is executed.

When the right U-turn is executed at S73 or when the Left U-turn is executed at S75, the program is returned to S71 where it is judged whether or not the state of the U-turn switch is changed. If No, the step S71 is repeated at a specified interval of time until the state of the U-turn switch is changed.

On the other hand, if it is judged at S76 that the state of the U-turn switch has been changed and both of the right and Left U-turn switches 67, 68 are turned off, the program steps to S77 where a returning operation to the neutral position is started.

Figure 9:
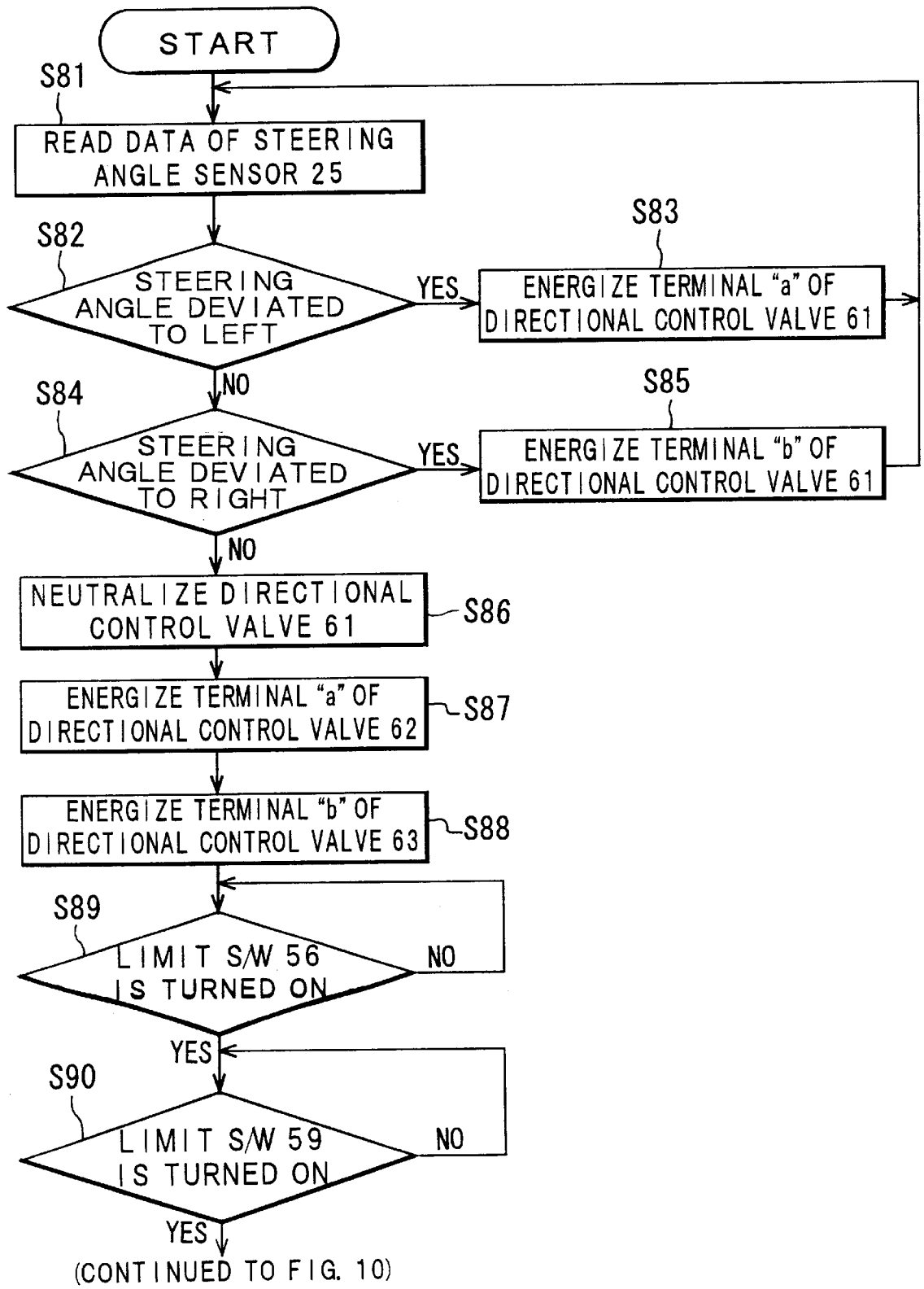
FIG. 9 and FIG. 10 are flowcharts of a steering control when a vehicle makes a U-turn to the right.

First, an operation of the right U-turn will be described by referring to FIG. 9 and FIG. 10.

When the operation of the right U-turn is started, the hydraulic controller 65 reads the data of the steering angle sensor 25 and detects a relative steering angle of the rear Left wheel 11L with respect to the rear axle housing 10. If it is detected at S82 that the rear wheel 11L is deviated to the right compared to the neutral position, at S83 the hydraulic controller 65 energizes a solenoid at the terminal "a" of the directional control valve 61. As a result, the hydraulic cylinder 23 for steering the rear wheels is contracted so as to correct the rear wheels 11L and 11R to the left.

On the other hand, if it is detected at S84 that the rear wheel 11L is deviated to the Left with respect to the neutral position, at S85 the hydraulic controller 65 energizes a solenoid at the terminal "b" of the directional control valve 61, whereby the hydraulic cylinder 23 is expanded so as to correct the rear steering wheels 11L and 11R to the right.

These corrections of the rear steering wheels 11L and 11R are continued to be made until the relative steering angle becomes zero with respect to the neutral position. That is, the steps S81, S82 and S84 are executed until when it is judged that the steering angle is neither deviated to the right at S82 nor deviated to the left at S84. When the relative steering angle is zero with respect to the neutral position, the axle Line RC of the rear axle housing 10 is in parallel with the rotational axis WL of the rear wheel 11L. At this moment, at S86 the current is stopped to be fed neither to the terminal "a" nor to the terminal "b" so as to render the directional control valve 61 to fix at the neutral position. Thus, the hydraulic cylinder 23 is fixed so as not to change the Length thereof and the rear steering wheels 11R, 11L are fixed at the relative steering angle "zero".

Next, when at S87 the current is fed to the terminal "a" of the directional control valve 62 and to the terminal "b" of the directional control valve 63, the rods 50 and 51 of the hydraulic cylinder 40 both are gradually protruded from the cylinders 42, 43 to give a yaw motion about the yawing axis 37 to the rear axle housing 10 in the counterclockwise direction. At S89 and S90, when it is confirmed that both the Limit switches 56 and 59 are turned on and the hydraulic cylinder 40 is in "most expanded condition", at S92 and S93, the directional control valves 62 and 63 are positioned at the neutral position so as to hold the hydraulic cylinder 40 at "most expanded condition". Thus, the rear axle housing 10 is yawed by a θ (in this embodiment 15) degrees counter-clockwise on the plan view as shown in FIG. 10 and is fixed in this state.

In the working vehicle 1 according to this embodiment, after the axis line RC of the rear axle housing 10 is let to be in parallel with the rotational axes WL and WR of the rear steering wheels 11L and 11R respectively, then the rear axle housing 10 is yawed about the yawing axis 37. Therefore, when the rear axle housing 10 is yawed, a side slip does not occur at the Left and right rear steering wheels 11L and 11R. Further, since the differential gears absorb a rotational difference between the left and right steering wheels 11L, 11R, there is no side slip in the rotational direction of the wheels. Thus, according to the working vehicle 1 of the embodiment the rear axle housing 10 can be yawed without damaging the lawn.

Figure 10:
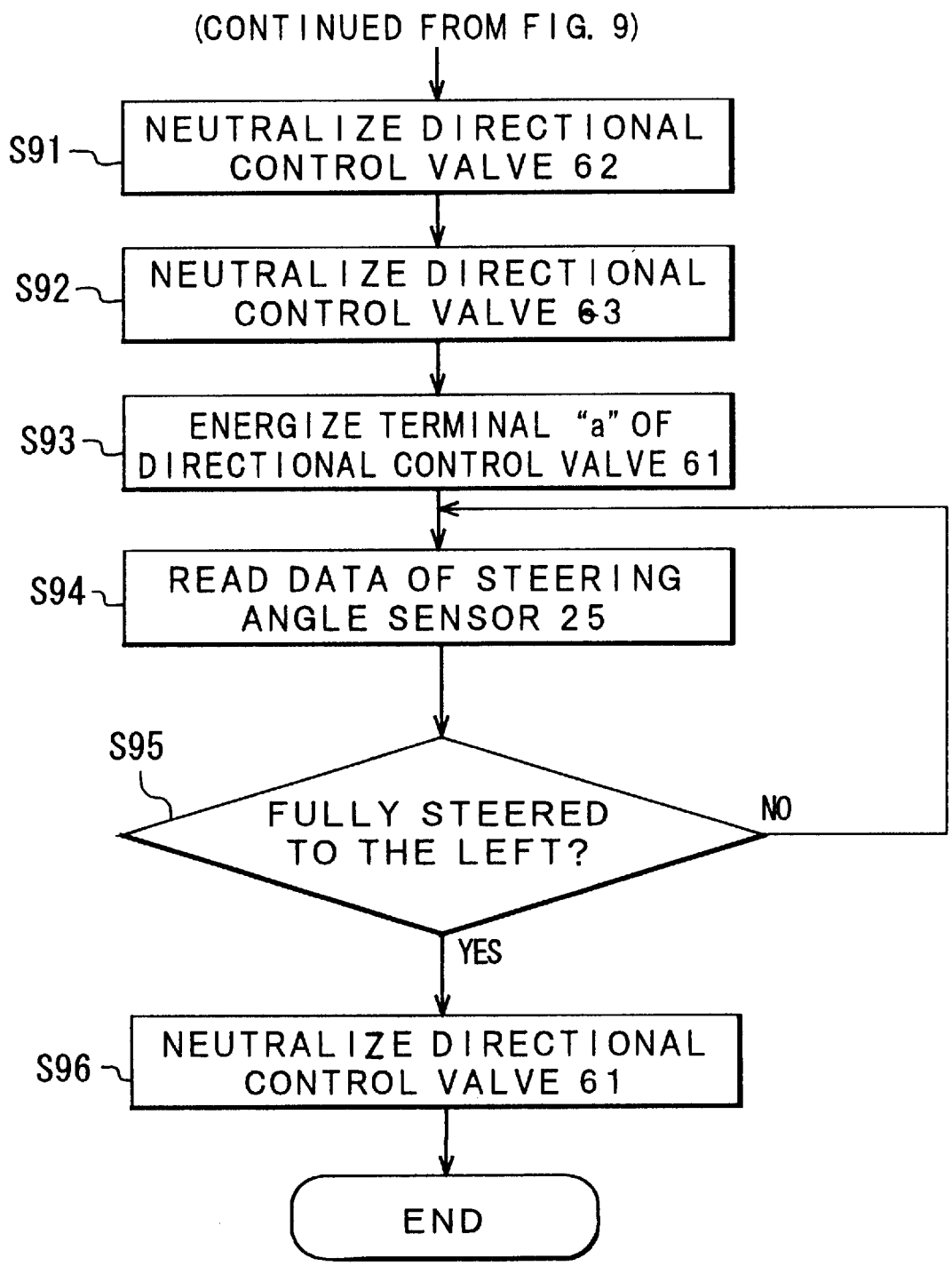

When the rear axle housing 10 finishes the yaw motion and is fixed at "most expanded condition", at S93 of FIG. 10 the hydraulic controller 65 feeds current to the terminal "a" of the directional control valve 61 to contract the hydraulic cylinder 23 for steering the rear wheels. Thus, the left and right rear steering wheels 11L and 11R are steered gradually to the left with the help of the Ackermann steering mechanism. Since the rear steering wheels 11L and 11R are steered with the rear axle housing fixed, it is possible to know accurately the steering angle (absolute steering angle) against the vehicular center line C from the steering angle sensor 25, therefore the steering angle of the left and right rear steering wheels 11L and 11R can be controlled precisely. This enables the working vehicle to move accurately from the mowed pass to the neighboring unmowed pass. When the rear steering wheels 11L and 11R are steered, since the Ackermann steering mechanism does not produce a side slip at the Left and right steering wheels 11L and 11R, the Lawn is saved from being damaged.

Figure 13:
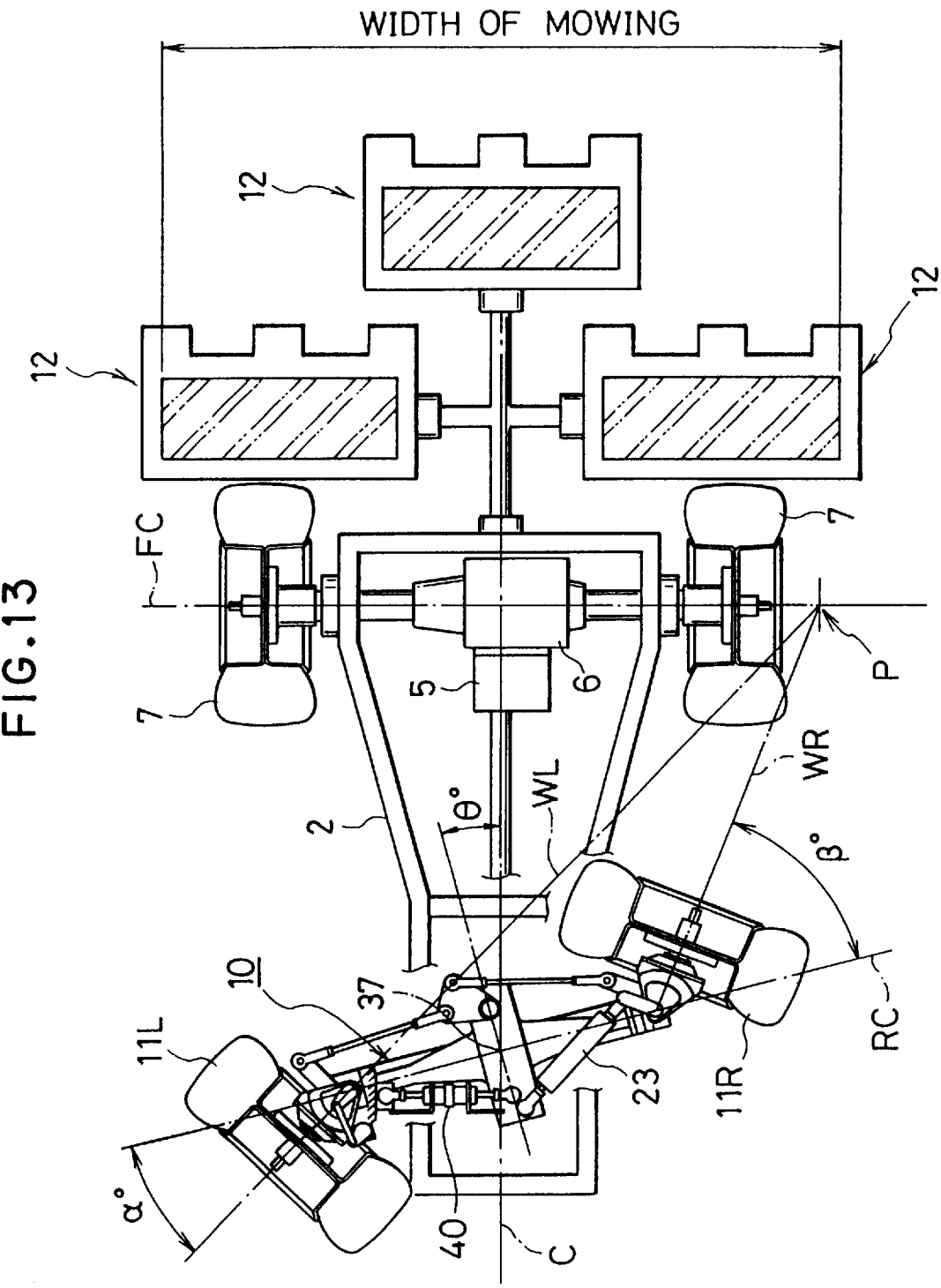
FIG. 13 is a plan view showing a working vehicle when making a U-turn with a minimal turning radius in a state of a rear axle housing swung to the left at a specified angle with rear steering wheels rotated about a king pin in the same direction as the rear axle housing at a specified angle.

At S94, the relative steering angle of the Left rear steering wheel 11L with respect to the rear axle housing 10 is read and when it is judged at S95 that this relative steering angle is fully steered to the left, at S96 the hydraulic controller 65 places the directional control valve 61 in the neutral condition to fix the length of the hydraulic cylinder 23. Thus, the left and right rear steering wheels 11L and 11R are fixed in a state fully steered to the left. This state is shown in FIG. 13 by a relative angle α for the left rear steering wheel 11L and a relative angle β for the right rear steering wheel 11R. Further, as referred to FIG. 13, the rotational axis WL of the left rear wheel 11L and the rotational axis WR of the right rear steering wheel 11R both are met at a point P with the rotational axis FC of the front wheels 7. That is to say, the working vehicle 1 makes a turn around the point P. As can be known from FIG. 13, in the working vehicle 1 according to the embodiment, when the vehicle makes a U-turn (turn by 180 degrees) around the point P, the width of mowing overlaps the next width of mowing and therefore there is no portion left unmowed.

When the right U-turn is finished, the steering must be returned to the neutral position (a returning operation to the neutral position). Next, this returning operation will be described with reference to a routine for the returning operation to the neutral position in FIG. 14.

Figure 14:
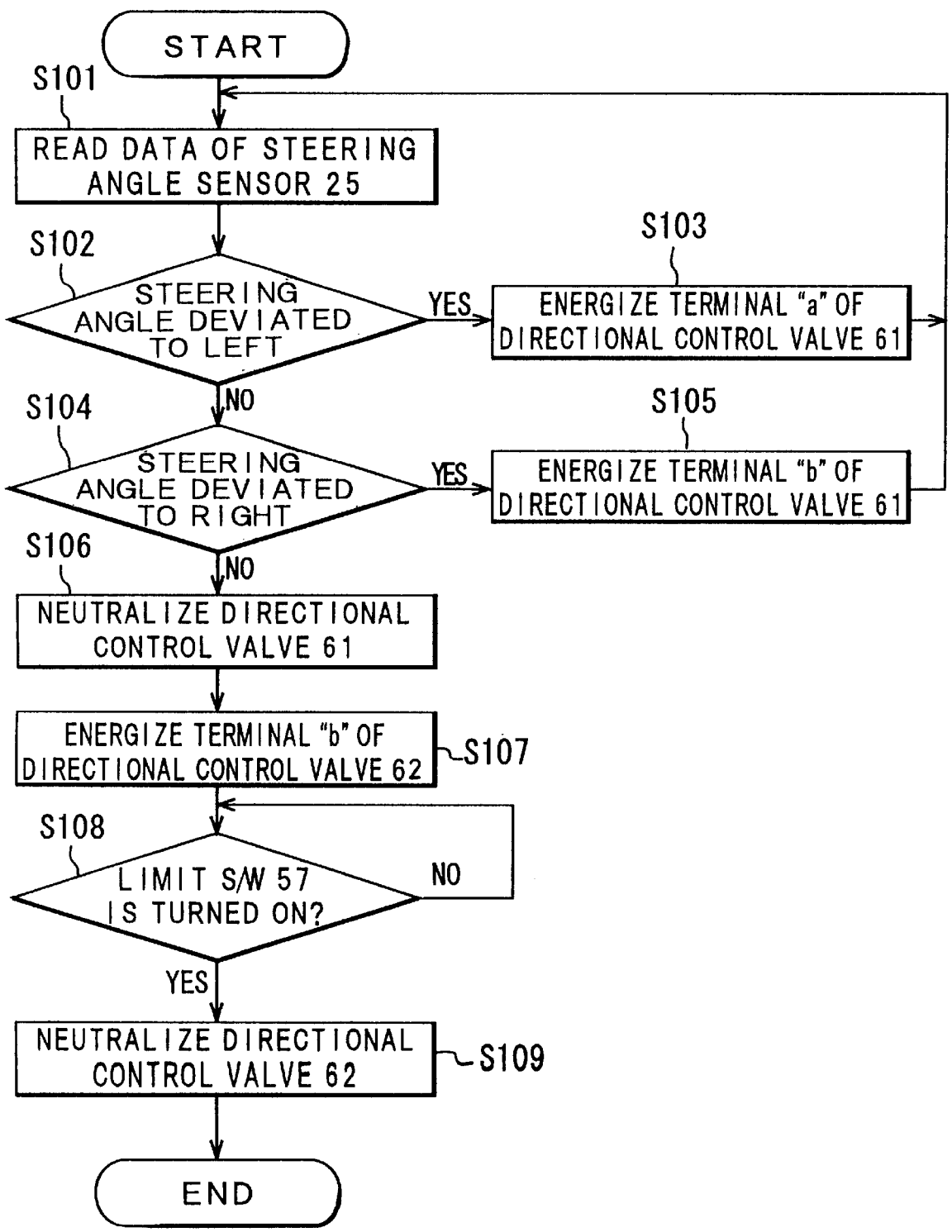
FIG. 14 is a flowchart of an operation of hydraulic control valves when the steering is returned to the neutral position.

Referring to FIG. 14, the autonomous running controller 66 detects a running direction of the working vehicle 1 by use of a magnetic direction sensor D mounted on a mast M of the working vehicle 1. When the vehicle makes a U-turn to the right and it is detected that the Longitudinal direction of the vehicle is turned by 180 degrees approximately, the autonomous running controller 66 turns the right U-turn switch 67 off. Then, at S76 of FIG. 8 the hydraulic controller 65 detects that both the left and right U-turn switches 67, 68 are turned off and then a returning operation to the neutral position is executed at S77.

When this returning operation is started, the hydraulic controller 65 reads the data of the steering sensor 25 at S101 shown in FIG. 14. When the right U-turn operation is switched to the returning operation, since the steering angle of the rear wheels is still deviated to the left, the program goes from S104 to S105 where the terminal "b" of the directional control valve 61 is energized so as to expand the cylinder 23 and as a result the rear steering wheels 11 are steered to the right to reduce the steering angle thereof. At this moment, no side slip occurs at the left and right rear steering wheels 11L, 11R with the help of the Ackermann steering mechanism.

Figure 11:
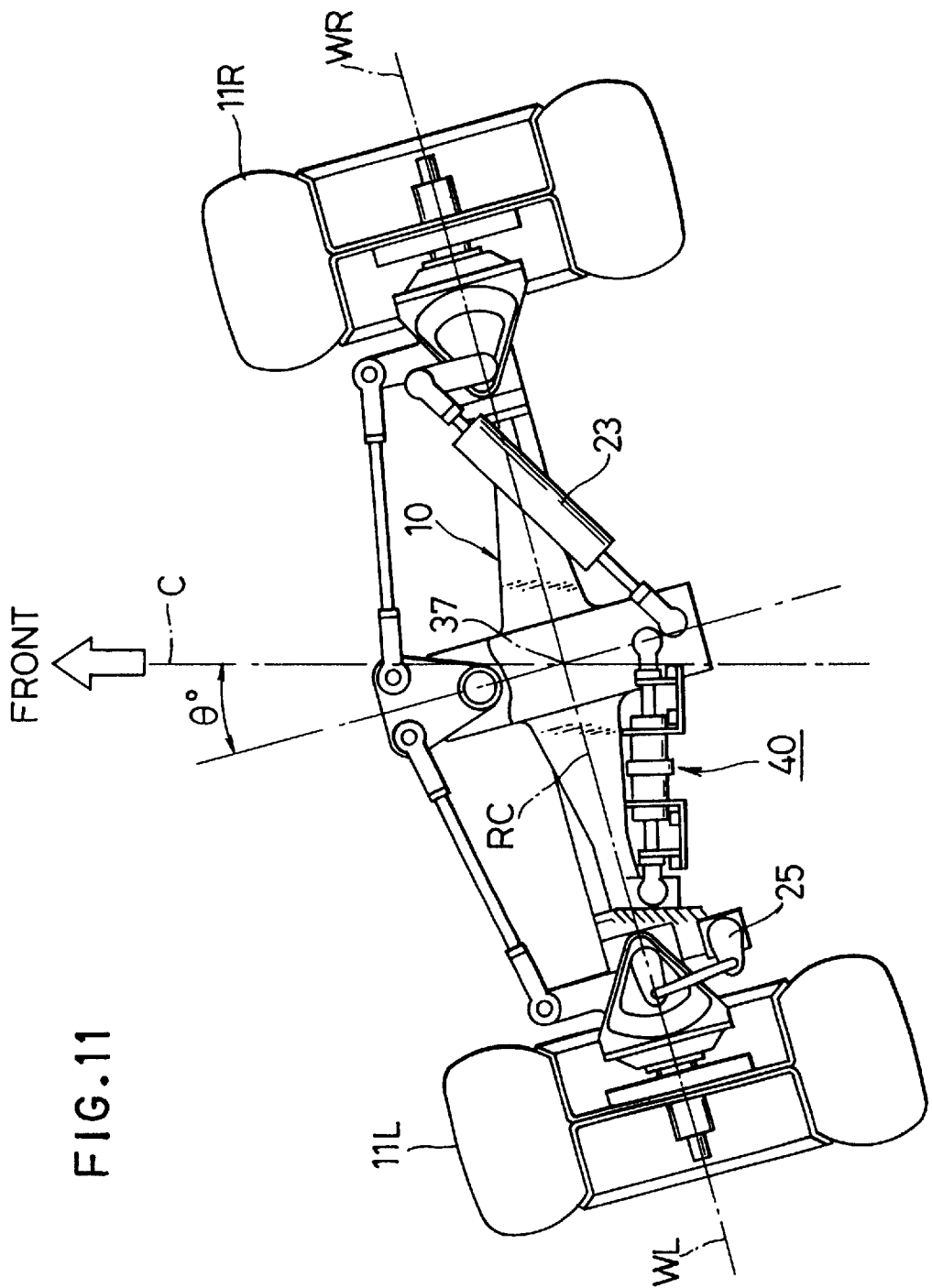
FIG. 11 is a plan view showing a state of a rear axle housing swung to the left at a specified angle with rear steering wheels fixed at a neutral position.
Figure 12:
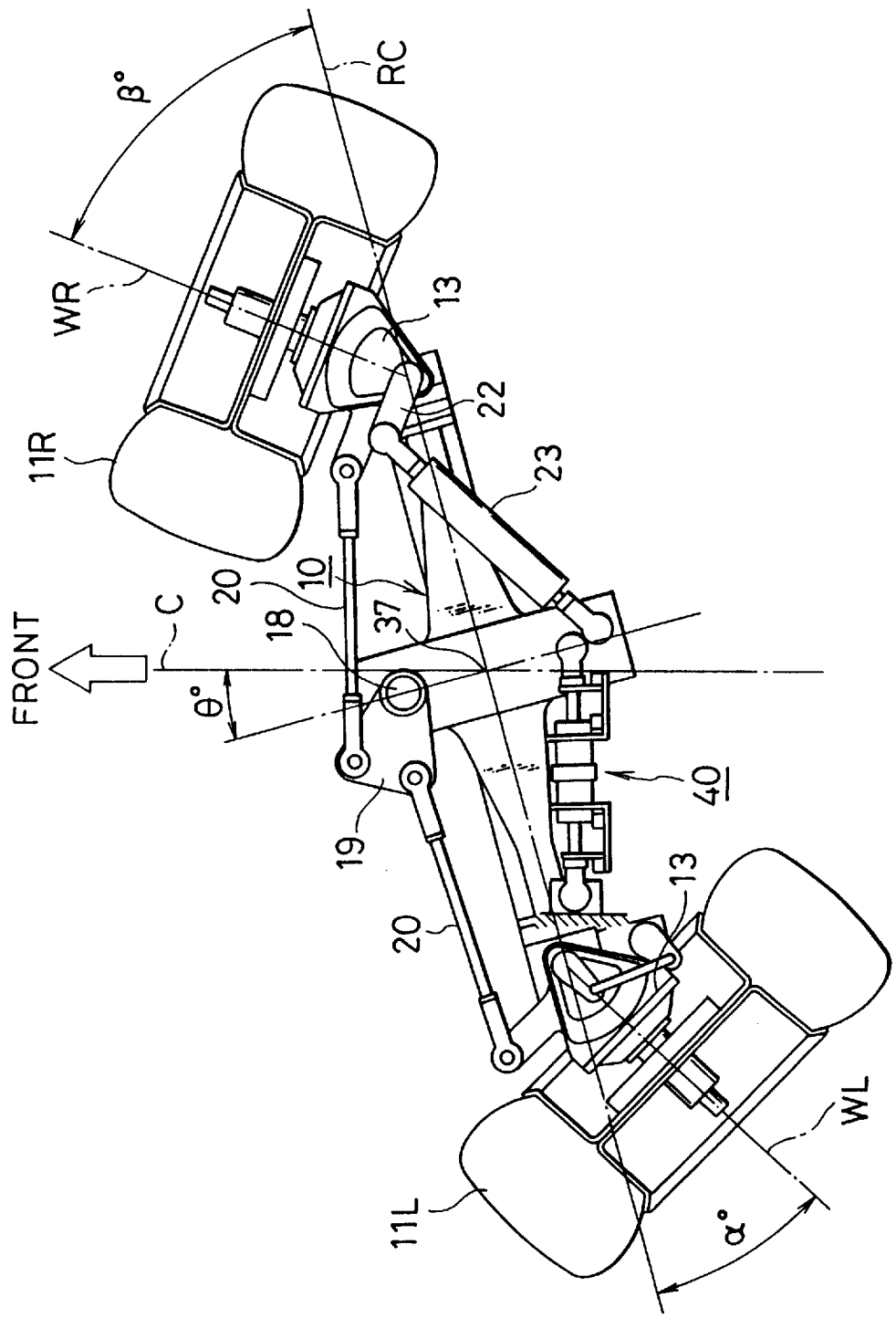
FIG. 12 is a plan view showing a state of a rear axle housing swung to the left at a specified angle with rear steering wheels rotated about a king pin in the same direction as the rear axle housing at a specified angle.

When it is confirmed through S101, S102 and S104 that the steering angle of the rear steering wheels 11 is zero, at S106 the directional control valve 61 is set to the neutral position. As a result of this, the hydraulic cylinder 23 is fixed at the neutral position and the relative steering angle of the left and right rear steering wheels 11L, 11R is held to be zero with respect to the rear axle housing 10, as shown in FIG. 11.

When the relative steering angle is returned to zero, at S107 the hydraulic controller 65 feeds current to the terminal "b" of the directional control valve 62 so as to intrude the rod 50 into the cylinder 42. As a result, the rear axle housing 10 is yawed about the yawing axis 37. At this moment, since the relative angle of the rear steering wheels 11 is kept zero with respect to the rear axle housing 10, the Lawn is never damaged by the rear steering wheels. In performing a returning operation of the rear axle housing 10, the terminal "a" of the directional control valve 63 may be energized. In this case, the rod 51 is intruded into the cylinder 43.

At S108, when it is confirmed that the limit switch 57 is operated, the program steps to S109 where the directional control valve 62 is set to the neutral position, whereby the hydraulic cylinder 40 for yawing the rear axle housing 10 gets into "intermediate condition" that the rod 50 at one side has been intruded to the full into the cylinder 42 and the rod 51 at the other side has been fully protruded to the from the cylinder 43. Therefore, the rear axle housing 10 is fixed in the neutral position in which the axle Line RC of the rear axle housing 10 is met orthogonally with the longitudinal center line C of the vehicle.

With respect to the Left U-turn, the operation is done in a similar way to the aforementioned right U-turn operation.

Since the working vehicle 1 runs about anywhere in the field, it must have a function for sometimes going straight and sometimes making a turn. According to the embodiment of the present invention, when the working vehicle 1 makes a small turn other than a U-turn, the steering operation is performed only by steering the Left and right rear steering wheels 11L, 11R with the rear axle housing held in "intermediate condition". In this case, the hydraulic controller 65 fixes the rear axle housing 10 at "intermediate condition" and controls the hydraulic cylinder 23 only.

In this embodiment, the yawing and steering mechanisms are all provided on the rear wheel side, however these may be furnished on the front wheel side. Further, in this embodiment, the hydraulic cylinder for yawing the rear axle housing is constituted by a pair of cylinders integrally connected with each other on a common axis, however this pair of cylinders may be connected integrally in parallel with each other.

Summarizing the steering system of the working vehicle according to the present invention, since the steering system is constituted such that the wheels are steered according to the Ackermann steering mechanism while the axle housing having those wheels is in a yawed condition against the Longitudinal center line of the vehicle, it is possible to acquire a substantially Large absolute steering angle and a minimal turning radius. Further, since the axle housing is yawed by the expansion force or contraction force of the hydraulic cylinder, the axle housing can make a quick yaw motion, thereby the working vehicle can perform a swift U-turn. Further, since the hydraulic cylinder comprises a pair of cylinders each of which is operated independently, the length of the hydraulic cylinder can be selected at three positions, a most expanded condition, a most contracted condition and an intermediate condition and fixed at these three positions respectively, whereby the absolute steering angle of the wheels can be controlled accurately and a correct steering operation can be attained. The correct steering operation is important when the working vehicle attempts to catch the next mowing pass properly. Further, since the axle housing is yawed while the relative steering angle of the wheels is zero, the wheels never produce side slips damaging the lawn, when the axle housing is yawed. Furthermore, since the steering system according to the present invention has a simple construction, the weight of the vehicle can be reduced and therefore less damages are provided on the lawn.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for a vehicle having a chassis and an engine mounted on said vehicle for driving said vehicle, comprising:

an axle housing rotatably coupled with said vehicle;

a left and a right king pin axis connected with a left and a right end of said axle housing, respectively;

a left and a right steering wheel rotatably connected with said axle housing about said left and said right king pin axis, respectively;

swinging means for swinging said axle housing in a horizontal plane about a swinging axis while said left and said right steering wheels are in a neutral position; and rotating means for rotating said left and said right steering wheels about said left and said right king pin axes, respectively.

2. A steering system for a vehicle having a chassis and an engine mounted on said vehicle for driving said vehicle, comprising:

an axle housing rotatably coupled with said vehicle;

a left and a right king pin axis connected with a left and a right end of said axle housing, respectively;

a left and a right steering wheel rotatably connected with said axle housing about said left and said right king pin axis, respectively;

first swinging means for swinging said axle housing in a horizontal plane about a swinging axis at a specified swinging angle and for fixing said axle housing at said swinging angle while said left and said right steering wheels are in a neutral position;

first rotating means for rotating said left and said right steering wheels about said left and said right king pin axes, respectively, at a specified steering angle and for fixing said steering wheels at said specified steering angle, respectively, while said axle housing is at said specified swinging angle;

second rotating means for rotating said left and said right steering wheels from said specified steering angle back to a neutral position and for fixing said steering wheel at said neutral position;

second swinging means for swinging said axle housing in a horizontal plane from said specified swinging angle to a position where said axle housing and a lengthwise center line of said vehicle meet orthogonally and for fixing said axle housing at said position; and third rotating means for rotating said left and said right steering wheels about said left and said right king pin axes, respectively, discretionally while said axle housing is fixed at said position.

3. A steering system for a vehicle having a chassis and an engine mounted on said vehicle for driving said vehicle, comprising:

an axle housing rotatably coupled with said vehicle;

a left and a right king pin axis connected with a left and a right end of said axle housing respectively;

an Ackermann steering mechanism provided with said axle housing for steering said vehicle according to an Ackermann's steering condition;

a left and a right steering wheel rotatably connected with said axle housing about said left and said right king pin axis, respectively, so as to steer said vehicle according to said Ackermann steering mechanism;

swinging means for swinging said axle housing in a horizontal plane about a swinging axis while said left and said right steering wheels are in a neutral position; and rotating means for rotating said left and said right steering wheels about said left and said right king pin axes, respectively.

4. A steering system for a vehicle having a chassis and an engine mounted on said vehicle for driving said vehicle, comprising:

an axle housing rotatably coupled with said vehicle;

a left and a right king pin axis connected with a left and a right end of said axle housing respectively;

an Ackermann steering mechanism provided with said axle housing for steering said vehicle according to an Ackermann's steering condition;

a left and a right steering wheel rotatably connected with said axle housing about said left and said right king pin axis, respectively, so as to steer said vehicle according to said Ackermann steering mechanism;

first swinging means for swinging said axle housing in a horizontal plane about a swinging axis at a specified swinging angle and for fixing said axle housing at said swinging angle while said left and said right steering wheels are in a neutral position;

first rotating means for rotating said left and said right steering wheels about said left and said right king pin axes, respectively, at a specified steering angle and for fixing said steering wheels at said specified steering angle, respectively, while said axle housing is at said specified swinging angle;

second rotating means for rotating said left and said right steering wheels from said steering angle back to a neutral position and for fixing said steering wheel at said neutral position;

second swinging means for swinging said axle housing in a horizontal plane from said specified swinging angle to a position where said axle housing and a lengthwise center line of said vehicle meet orthogonally and for fixing said axle housing at said position; and third rotating means for rotating said left and said right steering wheels about said left and said right king pin axes, respectively, discretionally while said axle housing is fixed at said position.

5. The steering system according to claim 1, wherein:

said swinging means for swinging said axle housing comprises a hydraulic cylinder for applying a force to swing said axle housing about said swinging axis, a solenoid operated directional control valve for controlling said hydraulic cylinder and an electronic control apparatus for controlling said directional control valve.

6. The steering system according to claim 2, wherein:

said first swinging means for swinging said axle housing and for fixing said axle housing at said swinging angle comprises a hydraulic cylinder for swinging said axle housing about said axis and for fixing said axle housing at said swinging angle, a solenoid operated directional control valve for controlling said hydraulic cylinder and an electronic control apparatus for controlling said directional control valve.

7. The steering system according to claim 2, wherein:

said second swinging means for swinging said axle housing from said specified swinging angle to said position and for fixing said axle housing at said position comprises a hydraulic cylinder for swinging said axle housing about said axis and for fixing said axle housing at said swinging angle, a solenoid operated directional control valve for controlling said hydraulic cylinder and an electronic control apparatus for controlling said directional control valve.

8. A method of steering a vehicle having a chassis and an engine mounted on said vehicle for driving said vehicle, an axle housing rotatably coupled with said vehicle and pivotable about a swinging axis in a horizontal plane to steer said vehicle, a left and a right king pin axis connected with a left and right end of said axle housing, respectively, and a left and a right steering wheel rotatably connected about said left and said right king pin axis, respectively, with said axle housing so as to steer said vehicle, comprising the steps of:

swinging said axle housing in a horizontal plane about said swinging axis while said left and said right steering wheels are in a neutral position so as to reduce a turning radius of said vehicle; and rotating said left and said right steering wheels about said left and said right king pin axes, respectively, so as to steer said vehicle while said axle housing is fixed about said swinging axis.

9. A method of steering a vehicle having a chassis and an engine mounted on said vehicle for driving said vehicle, an axle housing rotatably coupled with said vehicle and pivotable about a swinging axis in a horizontal plane to steer said vehicle, a left and a right king pin axis connected with a left and a right end of said axle housing, respectively, and a left and a right steering wheel rotatably connected about said left and said right king pin axis, respectively, with said axle housing so as to steer said vehicle, comprising the steps of:

swinging said axle housing in a horizontal plane about said swinging axis at a specified swinging angle and fixing said axle housing at said swinging angle while said left and said right steering wheels are in a neutral position so as to reduce a turning radius of said vehicle;

rotating said left and said right steering wheels about said left and said right king pin axes, respectively, at a specified steering angle and fixing said left and said right steering wheels at said specified steering angle while said axle housing is at said specified swinging angle;

rotating said left and said right steering wheels from said specified steering angle back to a neutral position and fixing said steering wheels at said neutral position;

swinging said axle housing in a horizontal plane from said specified swinging angle to a position where said axle housing and a lengthwise center line of said vehicle meet orthogonally and fixing said axle housing at said position; and rotating said left and said right steering wheels about said left and said right king pin axes, respectively, discretionally while said axle housing is fixed at said position.

10. A steering system for a vehicle having a chassis, comprising:

an axle member having a first end and a second end and being pivotable relative to said chassis of said vehicle;

first and second knuckle members pivotably connected to said first and second ends of said axle member, respectively;

first pivot means for pivoting said axle relative to said chassis; and second pivot means for pivoting said first and said second knuckle members relative to said axle member.

* * * * *